UNITED STATES PATENT OFFICE.

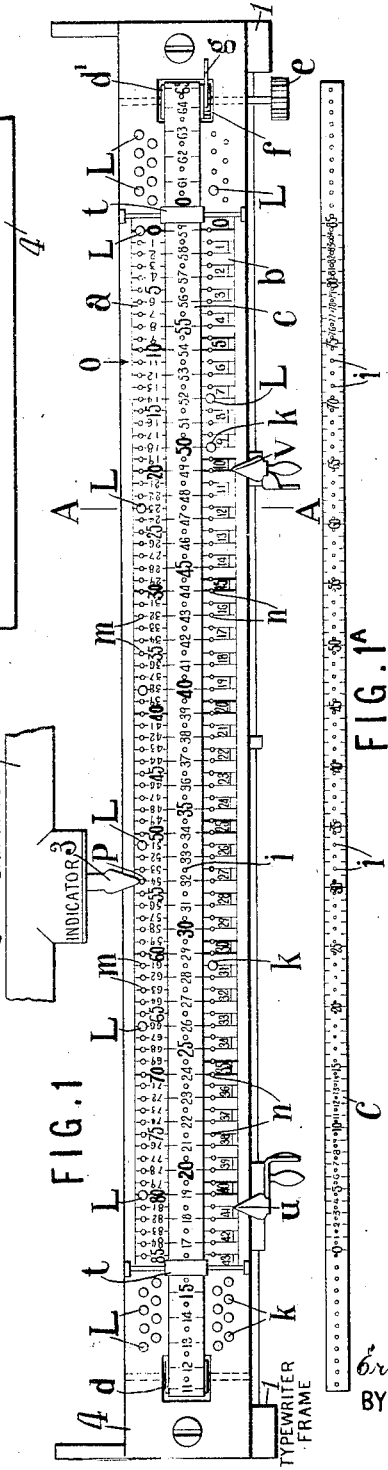
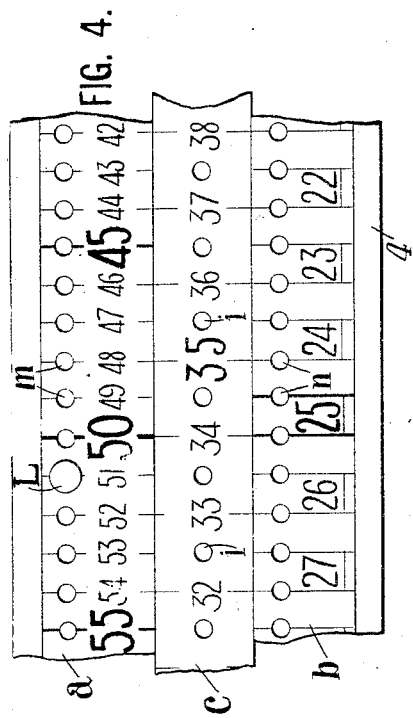
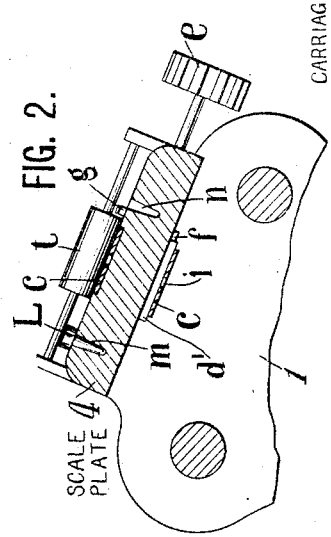

ERNEST AMABLE NARCISSE COLADANT, OF PARIS, FRANCE, ASSIGNOR TO UNDERWOOD TYPEWRITER COMPANY, OF NEW YORK, N. Y., A CORPORATION OF DELAWARE.

TYPE-WRITING MACHINE.

1,097,170.

Specification of Letters Patent.

Patented May 19, 1914.

Application filed January 27, 1912. Serial No. 673,801.

*To all whom it may concern:*

Be it known that I, ERNEST AMABLE NARCISSE COLADANT, a citizen of France, residing at 39 Rue Sextius Michel, Paris, France, have invented certain new and useful Improvements in Type-Writing Machines, of which the following is a specification.

This invention relates to scales for typewriting machines by which margins may be easily ascertained so as to produce lines which are arranged symmetrically on the paper and by which typewritten matter may be properly centered either with respect to the full width of the written line or page as determined by the positions of the margin stops, or in various columns.

The device preferably includes two fixed scales and a third scale which is shiftable with respect to the other two scales. One of said fixed scales may be the ordinary scale plate of a typewriting machine, while the other fixed scale, which is placed so that it may be conveniently read in juxtaposition to the main typewriter scale, may also be graduated at letter-space intervals, but the graduations of the second scale are preferably numbered alternately. In other words, each numbered division on the second scale bears a number one-half as great as the number on the main scale plate of the typewriter.

The movable scale is also graduated at letter-space intervals, and its graduations are preferably numbered as are the graduations of the second fixed scale, but in the reverse direction. The movable scale may be in the form of an endless belt, one reach of which lies above the two fixed scales and between them, and said reach may be held down against said fixed scale by means of idle rolls under which said movable scale passes. The belt of the movable scale at each end may pass around suitable pulleys, one of which has a hand wheel by which it may be rotated, and said pulley may have short teeth on its surface to engage with corresponding perforations in the belt of the movable scale. A detent may engage depressions in said wheel so that when the movable scale is moved to any one position, the detent will tend to center the scale in position to aline its graduations with those of the other scales and to yieldingly hold said movable scale there.

Other features and advantages will hereinafter appear.

In the accompanying drawings, Figure 1 is a plan of the device. Fig. 1$^A$ is a plan view of the movable scale. Fig. 2 is a cross section in the plane A—A of Fig. 1. Fig. 3 is a detail sectional view showing the movable ribbon and its pulleys. Fig. 4 shows a part of the scales, greatly enlarged so as to represent more plainly the details of the inscriptions and to show an instance of the arrangement of the figures on scale $a$.

The frame 1 of an ordinary Underwood typewriting machine has guides (not shown) on which a carriage 2 travels, said carriage having on it an indicator or pointer 3 which travels along the front cross-bar 4 of the typewriting machine and indicates the position of said carriage on the scale plate $a$, which may be called the fixed main scale. On said cross-bar 4 is also mounted a fixed auxiliary scale $b$, and along this auxiliary fixed scale the left-hand margin stop $u$ and the right-hand margin stop $v$ may be mounted to slide in the ordinary manner so that the indexes or pointers thereon will indicate on said scale the letter-spaces at which said margin stops become effective.

The fixed main scale $a$ is graduated at letter-space intervals in the usual manner and may have every fifth division marked with the number appropriate to that division, or preferably every fifth division is marked in large figures and the intervening divisions are marked in small figures. Said small figures may be either readable from the front of the machine, as are the figures at every fifth space, or may be set sidewise, as seen in Fig. 1, so that larger figures may be used; and said sidewise figures will be extremely distinct from the figures marking the letter-space at every fifth interval.

The auxiliary fixed scale is graduated at every letter-space; said graduations being in line with the graduations on the main scale. But in said auxiliary scale the alternate letter-spaces are consecutively numbered beginning with zero and the numbers, instead of standing directly across the graduations, are set just to the right of the graduation to which they belong. For convenience in locating numbers, every fifth number on said scale is made larger than the intervening numbers, and each fifth number corresponds to a tens division on the main fixed scale.

At a convenient point in every graduation in each of the fixed scales $a$, $b$, there is cut a cylindrical socket $m$ and $n$, which is preferably slightly tapered and into which may be inserted a peg L having an enlarged head colored some distinctive color, such as green. Said heads are preferably smaller in diameter than the width of a letter-space to permit pegs to be inserted at adjacent letter-spaces. The sockets in the main scale $a$ are denoted by the reference numeral $m$, and the sockets in the auxiliary scale are denoted by the reference numeral $n$, and a set of pegs $k$ resembling the pegs L, except that their heads are of some other color, preferably red, may be inserted into the sockets $n$. By setting these pegs, any letter-space may be permanently or temporarily marked, thus avoiding all necessity of remembering the number of said space.

Between said main and auxiliary fixed scales lies a movable scale $c$ in the form of a belt, which is graduated at letter-space intervals numbered from left to right, but otherwise corresponding with the divisions on the fixed auxiliary scale, namely, being consecutively numbered at every alternate graduation. Said belt at the left-hand bight passes around a pulley $d$ having pegs $h$ on its surface which mesh with corresponding perforations $i$ in the belt $c$. Said belt at its opposite bight passes around a similar pulley $d'$ having corresponding pegs $h$ which enter the perforations $i$, and said pulley likewise comprises an extended shaft to which it is fast; there being a hand wheel $e$ fast on said shaft by which said pulley may be turned to bring the belt $c$ to any desired position, the belt being endless with its idle reach lying beneath the front bar 4 of the typewriter. The pulley $d'$ also comprises a series of depressions on its periphery with which a spring detent $g$ coöperates, so as to bring said belt to rest, and hold it with the graduations thereon registering with the graduations on the fixed main scale. The top reach of said belt is held in position by means of an idle pulley $t$ near each end thereof, which overlies said belt and holds it close against the surface of the cross-bar 4. The cross-bar 4 is provided with a group of sockets $m$, $n$, at each end thereof, beyond the end of the fixed main scale. In these sockets, any of the pegs L, $k$ may be inserted when not in use on the scales for the time being.

If it is desired to insert typewritten matter in any of several columns, said columns may be distinguished from each other by means of green pegs L set in the sockets $m$ in the main scale at letter-space graduations corresponding to the dividing lines between the columns. Any important column can be distinguished by having it marked with a red peg instead of a green peg. If these columns are of the same number of letter-spaces each and it is convenient to add and subtract the number of letter-spaces from one peg to the next, the distance may be read off on the movable scale, and if the movable scale is shifted to the last set peg, the next peg may be inserted by reading off the desired number from the movable scale, or the scale itself may be moved a corresponding number of letter-spaces, so that the zero on said scale will indicate the point at which a peg is to be set.

The red-headed pegs $k$ may be utilized for indicating the margin of the work which is normally done, and if marginal notes are to be inserted, one of said pegs should be inserted two letter-spaces to the right of the margin stop, so as to indicate to the operator when said marginal work is within two letter-spaces of the edge of the normally typewritten line. These two letter-spaces serve as a demarcation between the marginal and the regular typewritten line. For example, if the margin begins at 20, as seen in Fig. 1, the red peg $k$ should be set at 18, as shown in said figure. The movable scale may be shifted until its zero is opposite the red pointer thus set for marginal work and the movable scale will then temporarily play the same part in positioning work that the auxiliary fixed scale plays in work which extends across the full letter-space travel of the typewriter.

If the movable scale is positioned with its zero set at the extreme left-hand end of the fixed auxiliary scale, the left-hand margin peg may be positioned exactly symmetrical with the right-hand margin peg by noting on the fixed auxiliary scale the point at which the right-hand margin peg is set, and then setting the left-hand margin peg opposite the point on the movable scale which bears the same number as does the fixed auxiliary scale at the right-hand margin peg.

When there are a number of headings to be inserted in one column, a peg L may be inserted in the auxiliary fixed scale at the point as far from the zero of said scale as the width of said column. This peg may be utilized in centering headings in said column. For this purpose, the peg is used in connection with the movable scale as follows: Suppose it is desired to center the word "description" in the column bounded by the letter-spaces 51 and 66. First, a peg L is inserted in the auxiliary scale $b$ in line with the scale number 14 on the main scale because there are fourteen letter-spaces which can be written in said column. Then it will be noted that the number on the fixed auxiliary scale opposite the first letter-space in said column is 26, because the first letter-space in said column which can be written on is 52. If now the movable scale is shifted to bring the number 26 opposite the peg L at 66, it will be found that the number on said scale opposite the peg L at 14 is 52, (see Fig. 1). This is true because the auxiliary and movable scales are graduated identically but in opposite directions.

The exact letter-space at which the word "description" is to be begun in said column may be determined as follows: Set the typewriter carriage at zero and then "spell out" on the space bar the number of letters in the said word "description". The point at which the carriage comes to rest after striking the last letter of said word indicates on the movable scale the letter-space 54, and it will be found that if the carriage is now set at the letter-space 54 on the main scale, the word "description" will be centered exactly in the column between peg at 51 and peg at 66. Some suggestions may be made to utilizing this combination of scales for margin work and other purposes to give the most artistic results. One of these is that punctuation marks coming at the end of the line should not be counted in letter-spaces. Another is that when a number is read off which falls between the number graduations on the auxiliary scales, the larger adjacent number should be always read off and not the lower number.

The movable auxiliary scale c may be used in conjunction with the main scale a as a centering device to readily determine the center of any written line for which the adjustable margin stops may be set. For this purpose the movable scale c is adjusted so that the scale number thereon at the left-hand margin stop is the same as the scale number on the main scale at the right-hand stop. The number on the movable scale at the right-hand stop will then indicate the number on the main scale to which the carriage indicator must be brought to center the carriage with respect to the margin stops. Thus, for example, if the right-hand margin stop is at 20 on the main scale, Fig. 1, and the left-hand margin stop is at 78 on the main scale, the movable scale is adjusted to bring the number 20 thereon, in line with 78 on the main scale. It will then be seen that the number on the movable scale in line with the right-hand margin stop is 49; therefore 49 on the main scale indicates the position to which the indicator 3 on the carriage must be brought to center the carriage between the margin stops. To center a word, as, for example, the word "description" when the margin stops and scale c are set as in the example just given, the carriage is moved to the right against the margin stop v and the space bar operated once for each letter in the word "description". This brings the indicator 3 on the carriage between 43 and 44 on the movable scale; 44, therefore, indicates the number on the main scale to which the carriage pointer should be brought. If the word "description" is now written, it will be exactly centered with respect to a line determined by the carriage stops u and v.

It may be further noted that the movable scale c may be used to indicate directly the center of the line of writing when the right-hand margin stop v is at zero and the left-hand stop u is in any position of adjustment. For this purpose, the movable scale is adjusted to bring its zero point in line with the stop u. The number on the movable scale opposite zero on the main scale is then the number on the main scale at the center of the line of writing for which the stop u is set.

It will be observed that while the examples of using the scales have been described as being applied to the writing of headings, etc., they may be equally utilized for underscoring words and for other similar purposes.

Variations may be resorted to within the scope of the invention, and portions of the improvements may be used without others.

Having thus described my invention, I claim:

1. In a typewriting machine, the combination with a traveling carriage, of a scale for determining the position of a letter-space on said carriage, a second scale movable with reference to said first scale, a wheel having a driving connection with the movable scale for adjusting said movable scale, and a handle to rotate said wheel.

2. In a typewriting machine, the combination with a traveling carriage, of a scale for determining the position of a letter-space on said carriage, a second scale movable with reference to said first scale, a wheel for adjusting said movable scale, and a detent engaging said wheel for positively positioning said movable scale.

3. In a typewriting machine, the combination with a traveling carriage and a scale for determining the position of a letter-space on said carriage, of a scale adjacent said first scale, two wheels engaged by said second scale, a handle for turning one of said wheels to locate said scale, and a detent for holding said scale alined.

4. In a typewriting machine, the combination with a traveling carriage, a scale and an index for determining the position of a letter-space on said carriage, of a movable scale adjacent said first scale to coöperate therewith and with said index, said movable scale formed of flexible material, and two rotating wheels for positioning said second scale with reference to said first scale.

5. In a typewriting machine, the combination with a traveling carriage and a scale for determining the position of a letter-space on said carriage, of a scale adjacent said first scale formed of flexible material, idle wheels holding said second scale in position, a wheel for positioning said flexible scale, and a detent for holding it alined.

6. In a typewriting machine, the combination with a traveling carriage and a scale for determining the position of a letter-space on said carriage, of a scale movable with respect to said first scale, a detent for holding said movable scale, a hand wheel for positioning it, and guides in which it slides.

7. In a typewriting machine, the combination with a bar, of a scale movable on said bar, a wheel lying within said bar which said scale engages, and a detent engaging said wheel for holding said scale positioned.

8. In a typewriting machine, the combination with a traveling carriage, of a scale for indicating the position of said carriage, pegs settable along said scale, a second scale having graduations thereon, pegs settable along said second scale, and a third scale shiftable with reference to said first two scales and graduated in conformity with one of said scales, but numbered in the reverse direction.

9. In a typewriting machine, the combination with a traveling carriage, of a scale for determining the position of said carriage graduated in letter-space intervals, a second scale adjacent said first scale graduated in alternate letter-space intervals, and a third scale lying between said two scales and shiftable longitudinally of said scales and graduated in conformity with one of said scales, but numbered in the reverse direction.

10. In a typewriting machine, the combination with a traveling carriage and a scale on the machine frame fixed with reference to said frame, of a second scale on said frame adjacent to said first scale, a belt lying adjacent said two scales graduated in conformity with one of said scales, but numbered in the reverse direction, a wheel around which said belt passes, and a detent which engages said wheel for arresting it so that the graduations on said belt scale will aline with the graduations on said other scales, and a hand wheel for turning said belt.

11. In a typewriting machine, the combination with a scale, of a second scale fixed relatively thereto, a belt having scale markings and extending along said scales, idler rollers holding said belt in apposition to said scales, a wheel over which said belt passes and which it engages, and a detent engaging said wheel.

12. In a typewriting machine, the combination with a scale, of a belt adjacent said scale comprising scale graduations, a toothed wheel over which said belt passes, and a detent engaging said toothed wheel to aline the graduations on said belt with the graduations on said fixed scale.

13. In a typewriting machine, the combination with a traveling carriage and a scale for determining the position of said carriage, of margin stops for limiting the travel of said carriage, pegs settable along said scale for indicating other positions of said carriage, and a movable scale coöperating with said stops and pegs.

14. In a typewriting machine, the combination with a bar, having two scales thereon, of tapered sockets located along one of said scales, and pegs for fitting into said sockets in positions to indicate letter-space positions along the work-sheet.

15. In a typewriting machine, the combination with a traveling carriage and scales for indicating letter-spaces on said carriage, of two rows of sockets on said scales, and different types of pegs insertible in either of said rows of sockets.

16. In a typewriting machine, the combination with a traveling carriage, of a scale plate, a margin stop arranged to be adjustable along said scale plate, and a scale adjustable along said margin stop, said adjustable scale being co-extensive with said scale plate, and extending continually over the full length thereof in its adjustments.

17. In a typewriting machine, the combination with a traveling carriage having a scale indicator, of a flexible band having a scale marked thereon along which said indicator moves during the travel of the carriage, and a roller about which said band runs to adjust the scale.

18. In a typewriting machine, the combination with a traveling carriage, of a flexible band adjustable in the direction of the carriage travel, said band having a scale marked thereon, and a roller on the machine frame over which the band runs to adjust its scale.

19. In a typewriting machine, the combination with a traveling carriage, of a flexible band extending in the direction of the carriage travel, scale markings on said band, a pointer on the carriage to travel along said band, and rollers on the machine frame over which said band extends and by means of which adjustment of said band is permitted.

20. In a typewriting machine, the combination with a traveling carriage, of a scale extending in the direction of the carriage travel and from one fixed point to another on the machine frame, and means to adjust the scale to bring different scale markings in view without varying said extent of the scale.

21. In a typewriting machine, the combination with a traveling carriage, of an endless band having a scale thereon, rollers mounted on the machine frame over which said band extends, and means to rotate one of said rollers and thereby cause the band to travel on the said rollers.

22. In a typewriting machine, the combination with a traveling carriage, of a scale coöperating therewith and formed of flexible material, rollers on which said scale runs, means to form a positive driving connection between one of said rollers and the scale, and a handle on said last-named roller to drive the scale.

23. In a typewriting machine, the combination with a traveling carriage, of a scale coöperating therewith and formed of flexible material, rollers on which said scale runs, means to form a positive driving connection between one of said rollers and the scale, and means for holding the scale adjusted at intervals corresponding to letter-space intervals of the carriage travel.

24. In a typewriting machine, the combination with a traveling carriage, of a flexible scale, rollers over which said scale extends, means for rotating one of said rollers and thereby driving the scale, and a spring detent engaging one of said rollers to yieldingly hold the scale in positions of adjustment at intervals corresponding to the spacings of the scale markings.

25. In a typewriting machine, the combination with a traveling carriage and adjustable margin stops therefor, of a scale adjustable to read from zero at one stop toward the other stop to indicate the distance between the margin stops.

26. In a typewriting machine, the combination with a traveling carriage and adjustable margin stops therefor, of a scale adjustable to read from zero at one stop toward the other stop to indicate the distance between the margin stops, the scale having graduations numbered to indicate intervals each equal to two letter-space intervals.

27. In a typewriting machine, the combination with a traveling carriage having an indicator, of an adjustable margin stop therefor, and a scale coöperating with the margin stop and adjustable to maintain its zero point at the margin stop to indicate the distance of the carriage indicator from said stop.

28. In a typewriting machine, the combination with a traveling carriage and adjustable margin stops therefor, of a adjustable scale having numbered graduations at intervals each double the extent of a letter-space movement of the carriage, a second scale coöperating with said first scale and having graduations designating spaces each equal in extent to a letter-space movement of the carriage, and indicators carried with said stops and indicating the positions of the stops along said scales.

29. In a typewriting machine, the combination with a traveling carriage and adjustable margin stops therefor, of a scale mounted on the machine frame and adjustable to indicate directly at one stop the number of letter-spaces from either stop to a point mid-way between said stops.

30. In a typewriting machine, the combination with a traveling carriage, an indicator thereon and a stationary scale having numbered graduations along which the indicator moves, of a second scale adjustable along the first scale and having numbered graduations, said second scale in its various positions of adjustment being operatively co-extensive with said stationary scale the distance between any two numbers on said movable scale being double the distance between like numbers on the stationary scale.

31. In a typewriting machine, the combination with a traveling carriage, of a stationary scale comprising numbered graduations reading from right to left at letter-space intervals, and an adjustable scale in apposition with said first named scale and provided with scale markings reading in the opposite direction, said adjustable scale in its several positions of adjustment being operatively co-extensive with said stationary scale.

32. In a typewriting machine, the combination with a traveling carriage and a graduated scale indicating the letter space position of the carriage, of adjustable margin stops, and a centering device coöperating with the margin stops to indicate the graduation on said scale at the center of the line for which the stops are set.

33. The combination with a carriage and two devices for determining the length of a line of writing, each device adjustable relatively to the other and to the carriage, of means to coöperate with said adjustable devices for mechanically determining the center of a line of writing whose position and length are determined by said adjustable devices.

34. The combination with a carriage, of a scale and two devices for determining the length and position of a line of writing, said devices adjustable relatively to each other and to the carriage, and means to coöperate with said adjustable devices and said scale for determining the center of a line of writing whose position and length are determined by said devices.

35. The combination with a carriage and a scale, of adjustable means to indicate on said scale the length and position of a line of writing, and a centering device coöperating with said indicating means to indicate on said scale the center of said line of writing.

36. The combination with a carriage, and devices for determining the length of a line of writing, each device adjustable relatively to the other and to the carriage, of an adjustable scale coöperating with said devices for determining the center of a line of writing whose position and length are determined by said adjustable devices.

37. The combination with a carriage and devices for determining the length and position of a line of writing, said devices adjustable relatively to each other and to the carriage, of indexes on said devices, and an adjustable centering device comprising a scale coöperating with said indexes to determine the center of a line of writing whose position and length are determined by said first-named devices.

38. The combination with a carriage, of a scale, two indexes, devices for determining the length and position of a line of writing, said indexes and devices adjustable relatively to each other and to the carriage, and an adjustable scale reading in the reverse direction from said first-mentioned scale and coöperating with said indexes to determine the point on said first-mentioned scale representing the center of a line of writing whose position and length are determined by said devices.

39. The combination with a carriage, of a scale, adjustable stops for determining the length and position of a line of writing, indexes adjustable with said stops, and an auxiliary scale adjustable relatively to said indexes to a position indicated by the position of said indexes, one of said indexes indicating on said auxiliary scale, when thus adjusted, the center of a line of writing whose length and position are determined by the position of said stop.

40. The combination with a carriage, of a scale having numbered graduations, devices for determining the length and position of a line of writing, indexes on said devices indicating on said scale the position of said devices, said devices adjustable relatively to each other and to the carriage, and an auxiliary scale adjustable along said first named scale and having numbered graduations, the distance between any two numbers being double the distance between the same numbers on the first-mentioned scale.

41. The combination with a carriage, of a scale having numbered graduations, devices for determining the length and position of a line of writing, indexes on said devices indicating on said scale the positions of said devices, said devices adjustable relatively to each other and to the carriage, and an auxiliary scale adjustable along said first named scale and having numbered graduations, the distance between any two numbers being double the distance between the same numbers on the first-mentioned scale, the numbers on the auxiliary scale reading in the reverse direction to those on the first named scale.

42. The combination with a carriage, of a main scale, devices for determining the length and position of a line of writing, indexes carried by said devices and adjustable therewith along the scale, and an auxiliary scale adjustable along the main scale to indicate directly at one index the number of letter-spaces in said line.

43. In a typewriting machine, the combination with a carriage and a scale indicating the position of the carriage, of an endless band extending along said scale, and a scale on said band.

44. In a typewriting machine, the combination with a carriage and a scale indicating the position of the carriage, of an endless band extending along said scale, and a scale on said band, the last mentioned scale comprising graduations numbered to indicate intervals, each equal in extent to two letter-space intervals.

45. The combination with a carriage, of a scale, devices for determining the length and position of a line of writing, said devices adjustable relatively to each other and to the carriage, indexes adjustable with said devices, an endless band extending along said scale and adjustable therealong, a scale on said endless band coöperating with said first named scale, and with said indexes for determining the center of a line of writing whose position and length are determined by said adjustable devices.

46. In a typewriting machine, the combination with a traveling carriage and a fixed bar having a scale for determining the position of said carriage, of pegs independently and movably lodgable in openings provided at letter-space intervals along said scale in positions to indicate arbitrary space measurements for a work-sheet, said bar having a group of idle lodgments for said pegs, near said scale, to support them when not in use.

47. In a typewriting machine, the combination with a traveling carriage having a scale indication, of a belt comprising a scale, a bar on which said belt travels, and a wheel on said bar for positioning said belt; said bar having lodgments to receive two kinds of pegs in positions for indicating columnar and marginal positions on a work-sheet.

48. In a typewriting machine, the combination with a traveling carriage, of two fixed scales reading alike as to direction but of different dimensional values, and a movable scale located between and reading oppositely to said fixed scales.

49. In a typewriting machine, the combination with a carriage, of an indicator and scale for said carriage, independently adjustable margin gages, pointers to indicate the positions of the gages, and an auxiliary scale; said auxiliary scale adjustable to indicate directly and correctly the number of letter-spaces in the line whose length is determined by said gages.

ERNEST AMABLE NARCISSE COLADANT.

Witnesses:
Louis G. Ferrer,
H. C. Coxe.